US011639708B2

(12) United States Patent
Schmid et al.

(10) Patent No.: US 11,639,708 B2
(45) Date of Patent: May 2, 2023

(54) ROTOR HUB OF A WIND TURBINE, AND METHOD FOR ASSEMBLING SUCH A ROTOR HUB

(71) Applicant: Wobben Properties GmbH, Aurich (DE)

(72) Inventors: Jonas Schmid, Westerstede (DE); Frank Gerdes, Großefehn (DE); Aike Janßen, Emden (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/046,267

(22) PCT Filed: Apr. 10, 2019

(86) PCT No.: PCT/EP2019/059141
§ 371 (c)(1),
(2) Date: Oct. 8, 2020

(87) PCT Pub. No.: WO2019/197490
PCT Pub. Date: Oct. 17, 2019

(65) Prior Publication Data
US 2021/0079884 A1   Mar. 18, 2021

(30) Foreign Application Priority Data
Apr. 11, 2018   (DE) .................... 10 2018 108 610.5

(51) Int. Cl.
*F03D 1/06* (2006.01)
*F03D 80/50* (2016.01)
*F03D 7/02* (2006.01)

(52) U.S. Cl.
CPC ......... *F03D 1/0658* (2013.01); *F03D 1/0691* (2013.01); *F03D 7/0224* (2013.01);
(Continued)

(58) Field of Classification Search
CPC ............................ F03D 1/0658; F03D 1/0691
See application file for complete search history.

(56) References Cited

U.S. PATENT DOCUMENTS

| 7,780,417 B2 * | 8/2010 | Kirchner | F03D 1/0658 416/207 |
| 7,874,800 B2 * | 1/2011 | Kirchner | F03D 7/0224 416/155 |
| 8,096,759 B2 * | 1/2012 | Bendel | F03D 1/0658 415/201 |

(Continued)

FOREIGN PATENT DOCUMENTS

| BY | 9025 C1 | 4/2007 |
| CN | 201187405 Y | 1/2009 |

(Continued)

*Primary Examiner* — Justin D Seabe
(74) *Attorney, Agent, or Firm* — Seed Intellectual Property Law Group LLP (57) ABSTRACT

A rotor hub of a wind turbine comprising a hub housing, which has a plurality of connecting flanges, which are each adapted for connection of a rotor blade, wherein each of the rotor blades is coupled to a pitch drive for rotating the rotor blade, wherein the pitch drive is connected to an arrangement of electrical control devices, which are adapted to control the pitch drive. The arrangement of the control devices is provided in a module as a structural unit, the module being connected as a whole to the hub housing.

6 Claims, 7 Drawing Sheets

(52) U.S. Cl.
CPC .......... *F03D 80/50* (2016.05); *F05B 2230/60* (2013.01); *F05B 2260/30* (2013.01); *F05B 2260/79* (2013.01)

(56) References Cited

U.S. PATENT DOCUMENTS

| | | | |
|---|---|---|---|
| 8,142,166 B2* | 3/2012 | Kita | F03D 13/10 |
| | | | 416/244 R |
| 9,316,204 B2* | 4/2016 | Fricke | F03D 15/20 |
| 9,631,605 B2* | 4/2017 | Neubauer | F03D 1/0658 |
| 2008/0272604 A1 | 11/2008 | Versteegh | |
| 2014/0064971 A1* | 3/2014 | Sivanantham | F03D 1/0658 |
| | | | 416/204 R |
| 2015/0003986 A1* | 1/2015 | Minadeo | F16C 35/042 |
| | | | 416/131 |
| 2015/0016998 A1 | 1/2015 | Pasquet et al. | |
| 2016/0312766 A1* | 10/2016 | Rasmussen | F03D 7/0224 |
| 2017/0030328 A1 | 2/2017 | Gudewer et al. | |
| 2017/0067438 A1 | 3/2017 | Ebbesen et al. | |

FOREIGN PATENT DOCUMENTS

| | | | | |
|---|---|---|---|---|
| CN | 205370866 U | 7/2016 | | |
| DE | 202005007450 U1 | 8/2005 | | |
| DE | 102007008167 A1 | 8/2008 | | |
| DE | 102010043435 A1 | 5/2012 | | |
| DE | 102014200276 A1 | 7/2015 | | |
| GB | 2526277 A | 11/2015 | | |
| JP | 2015-500950 A | 1/2015 | | |
| KR | 20120005275 A | * | 1/2012 | .......... F03D 1/0691 |
| RU | 2174190 C1 | 9/2001 | | |
| WO | 2015/090655 A1 | 6/2015 | | |

* cited by examiner

ROTOR HUB OF A WIND TURBINE, AND METHOD FOR ASSEMBLING SUCH A ROTOR HUB

BACKGROUND

Technical Field

The invention concerns a rotor hub of a wind turbine.

Description of the Related Art

On the German application from which priority is claimed the German Patent and Trade Mark Office searched the following documents: DE 102007008167 A1, DE 102010043435 A1, DE 102014200276 A1, DE 202005007450 U1 and WO2015/090655 A1.

Wind turbines are nowadays usually equipped with rotor blades whose pitch angle relative to the wind can be altered by motor means. In that way it is possible to influence the amount of 'mechanical' energy taken from the wind. If the power consumption and thus also the generation of electrical power by the wind turbine is to be reduced with high wind loads or a high network load then the blade angle is altered by means of the pitch drives in such a way that less mechanical energy is taken by the blade and the speed of rotation of the rotor hub decreases. Open-loop and closed-loop control methods for altering the pitch angle are generally known.

Electrical control devices are necessary for controlling the pitch drives, in particular in the implementation of a complex closed-loop control procedure, and such devices on the one hand have the aim of detecting operating parameters and environmental characteristics like for example wind speed, wind direction and gustiness while on the other hand there are those whose function is to provide for open-loop or closed-loop control of the pitch angle of the connected rotor blades in dependence on the detected variables.

The control devices are usually disposed in the nacelle of the wind turbine. It has proven to be advantageous in that respect for the control components to be arranged directly on the rotating part of the nacelle. Wind turbines are known from the state of the art, in which the electrical control devices for controlling the pitch drive of the rotor blades are arranged in the foremost part of the rotor hub under the so-called spinner cap. By virtue of the working volume which is only limitedly available there on the one hand, assembly of the control devices has been linked to a certain degree of complication and effort. On the other hand, the control devices after installation has been effected are not always readily accessible in operation so that there is seen to be a need for improvement in that respect.

Turbine types are also known from the state of the art, in particular turbines of the 4 MW class and upwards, in which the rotor blades were connected to the rotor hub by means of large-volume blade adaptors. In such wind turbines the electrical control devices were usually disposed in the blade adaptor. In regard to this design configuration also later accessibility to the control devices from the interior of the hub housing was difficult and assembly was also completed in a large number of installation steps.

BRIEF SUMMARY

One or more embodiments are directed to a rotor hub of the kind set forth in the opening part of this specification such that assembly of the electrical control devices is simplified. Accessibility to the electrical control devices from within the hub housing, for example for maintenance purposes, is improved.

One embodiment is directed to a rotor hub of a wind turbine comprising a hub housing which has a plurality of connecting flanges which are each adapted for connection of a rotor blade, wherein each of the rotor blades is coupled to a pitch drive for rotating the rotor blade, wherein the pitch drive is connected to an arrangement of electrical control devices which are adapted to control the pitch drive. The arrangement of the control devices is provided in a module in the form of a structural unit, wherein the module is connected as a whole to the hub housing. The pre-assembly of the electrical control devices to constitute a module as a structural unit can be effected completely outside the rotor hub so that sufficient space is available for mounting the control devices to the module and both fixing to the module and also the cabling for the control devices to each other can be quickly and easily effected as necessary by the assembly operative without space restrictions.

The module preferably has an interface for fixing to the respective connecting flange of the rotor hub. The interface is preferably a drilling or screw pattern correspondingly provided both on the connecting flange and also the module. The interface is preferably such that assembly of the module can be effected in exactly one orientation. That averts the risk of faulty assembly or defective orientation of the module on the rotor hub.

Preferably, one or more damping means are interposed between the module and the connecting flange at the interface for assembly of the module to the connecting flange in order to attenuate the transmission of mechanical vibrations between the hub housing and the electrical control devices. That has an advantageous effect in particular on the measurement technology employed in the control devices.

In a preferred embodiment the module has a supporting structure to which the arrangement of the control devices is fixed, wherein the supporting structure is preferably adapted to brace the rotor hub in particular in the region of the connecting flange in its installed state. In that aspect it is advantageous that the supporting structure for the electrical control devices performs a dual function. On the one hand, it implements stiffening bracing in the region of the connecting flange while on the other hand it carries the electrical control devices. In that way, with correct dimensioning of the supporting structure, it is possible to dispense with additional bracing elements in the region of the connecting flange, which in turn has a positive effect on the overall installation complication and effort in terms of the rotor hub.

In a further preferred embodiment, the connecting flanges of the rotor hub respectively have a flange plane and a through opening, wherein the through opening has a cross-sectional area projected on to the flange plane and all control devices are arranged within the projected cross-sectional area. If for example the through opening is a circular aperture in the connecting flange then, projected on to the flange plane, it will define a circular cross-sectional area. All control devices are then preferably arranged within that circular cross-sectional area, that is to say positioned radially within the cross-sectional area, so that no part of the control devices would lie radially outside that cross-sectional area. This configuration has the particular advantage that the module can be pushed in completely assembled form from the exterior against the connecting flange and the function of all control devices is completed in only one single working step without the control devices on the module for example also having to be moved into a particular transport position from which after installation of the module they would have to be moved back again to be ready for operation.

Further, preferably the supporting structure is fixed from outside the hub housing against the connecting flange respectively associated therewith. Fixing of the supporting structure to the connecting flange is preferably effected by means of screwing. Screwing from the outside in turn affords the advantage that there is markedly more space outside the hub housing for the use of tools and freedom of movement for personnel.

In a further preferred embodiment, the supporting structure has a plurality of supporting struts which are connected together in angular relationship. The supporting struts which are connected to each other in angular relationship and which for example can extend framework-like or at a 90° angle relative to each other form an effective stiffening means for the module and in the installed state on the connecting flange contribute to bracing thereof. At the same time, they permit flexible mounting of the control devices along the supporting struts. The supporting structure can extend substantially in the plane of or parallel to the plane of the connecting flange or however also perpendicularly thereto in the depthwise direction, that is to say the direction of insertion through the connecting flange.

In a further preferred embodiment, the supporting structure has a tread or walkway surface which covers the through opening in the connecting flange. In that way the supporting structure at the same time becomes the working platform for maintenance personnel within the rotor hub.

Additionally or alternatively to the above-described use of supporting struts the supporting structure preferably has a bracing disk. In this embodiment the walkway surface is preferably in the form of a surface, preferably the inner one of the two surfaces, of the bracing disk.

In a further preferred embodiment, the module has a manhole which is provided with a cover means and which is adapted for passing through from within the hub housing into the rotor blade. In embodiments in which the module has a walkway surface the manhole preferably extends in the form of an aperture through the walkway surface. The manhole is preferably covered by means of a hatch which can be selectively opened or closed, wherein the hatch also serves as a walkway surface when it is in the closed position.

The invention has been described hereinbefore with reference to the rotor hub by means of a first aspect. In a further aspect, the invention further concerns a method of assembling a rotor hub of a wind turbine, in particular a rotor hub according to one of the above-described preferred embodiments. The invention attains the above-indicated object thereof by the method including the following steps:

providing a hub housing which has a plurality of connecting flanges which are each adapted for connection of a rotor blade, wherein each of the rotor blades is coupled to a pitch drive for rotating the rotor blade, and either a) mounting an arrangement of electrical control devices for controlling the pitch drive on a module in such a way that the arrangement forms a structural unit, or b) providing a module which has an arrangement of electrical control devices for controlling the pitch drive in the form of a structural unit, connecting the module as a whole to the hub housing, and connecting the electrical control devices to the pitch drive.

The method according to the invention enjoys the same advantages and preferred embodiments as the above-described rotor hub so that in that respect attention is directed to the foregoing description for the avoidance of repetition. It is particularly advantageously noteworthy that in accordance with the method according to the invention the installation of all electrical control devices within the hub housing can be implemented in just one working step as soon as the electrical control devices were arranged on the module.

The assembly of electrical control devices for controlling the module can alternatively be outsourced and effected separately in respect of location and time from assembly of the rotor hub itself. The module can be transported in the form of a readymade unit for assembly of the rotor hub.

After connection of the module to the rotor hub it is now only still necessary to make the connection to the pitch drives insofar as they are not also already integrated in the module, which at the same time also represents a preferred embodiment of the invention.

A development of the method provides that at each connecting flange the rotor hub has a blade adaptor and the step of assembling the modules with the electrical control devices is effected prior to mounting of the blade adaptor.

Further preferably the method includes the step of bracing the rotor hub by means of the step of connecting the module.

BRIEF DESCRIPTION OF THE SEVERAL VIEWS OF THE DRAWINGS

The invention is described hereinafter by means of preferred embodiments with reference to the accompanying Figures in which.

DETAILED DESCRIPTION

Figure 1:
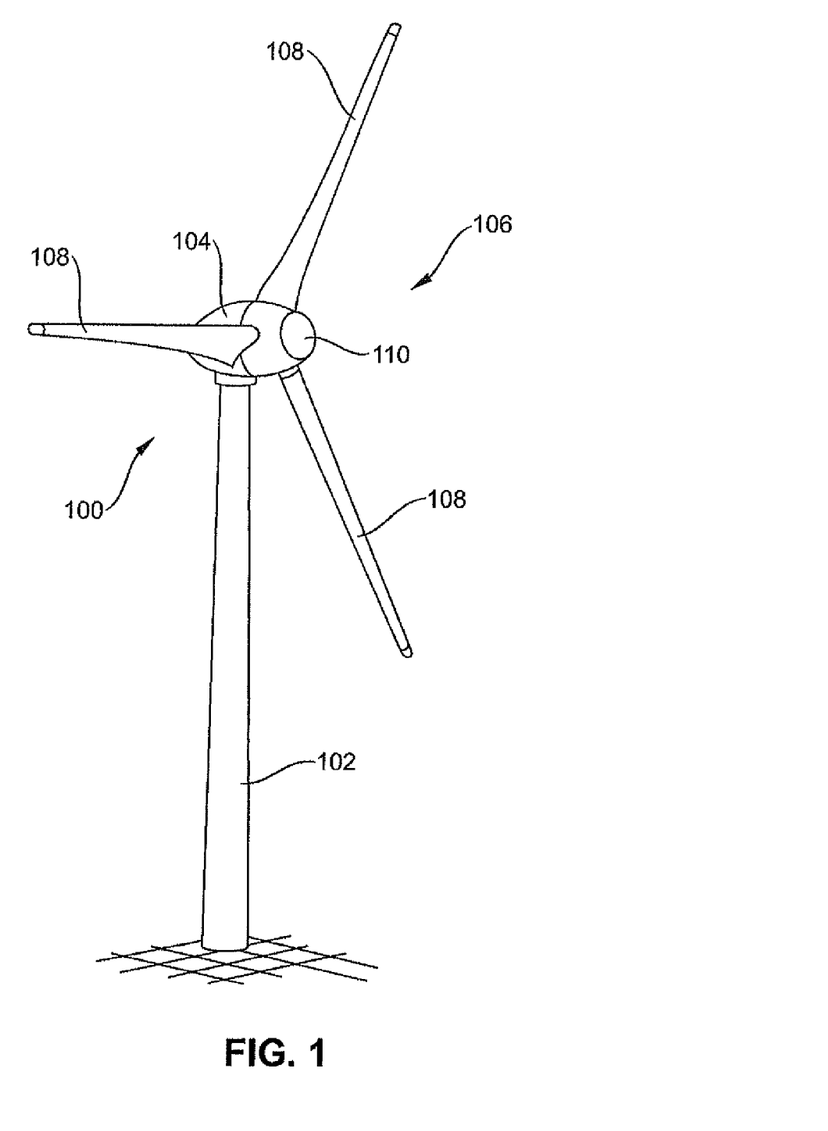
FIG. 1 shows a wind turbine according to a preferred embodiment.

FIG. 1 shows a wind turbine 100 comprising a tower 102 and a nacelle 104. Arranged on the nacelle 104 is a rotor hub 1 having three rotor blades 108 and (optionally) a spinner 110. The rotor blades 108 are arranged with their rotor blade root on a rotor hub. The rotor hub 1 is driven in rotation in operation by the wind and thereby drives a generator (not shown) in the nacelle 104.

Figure 2:
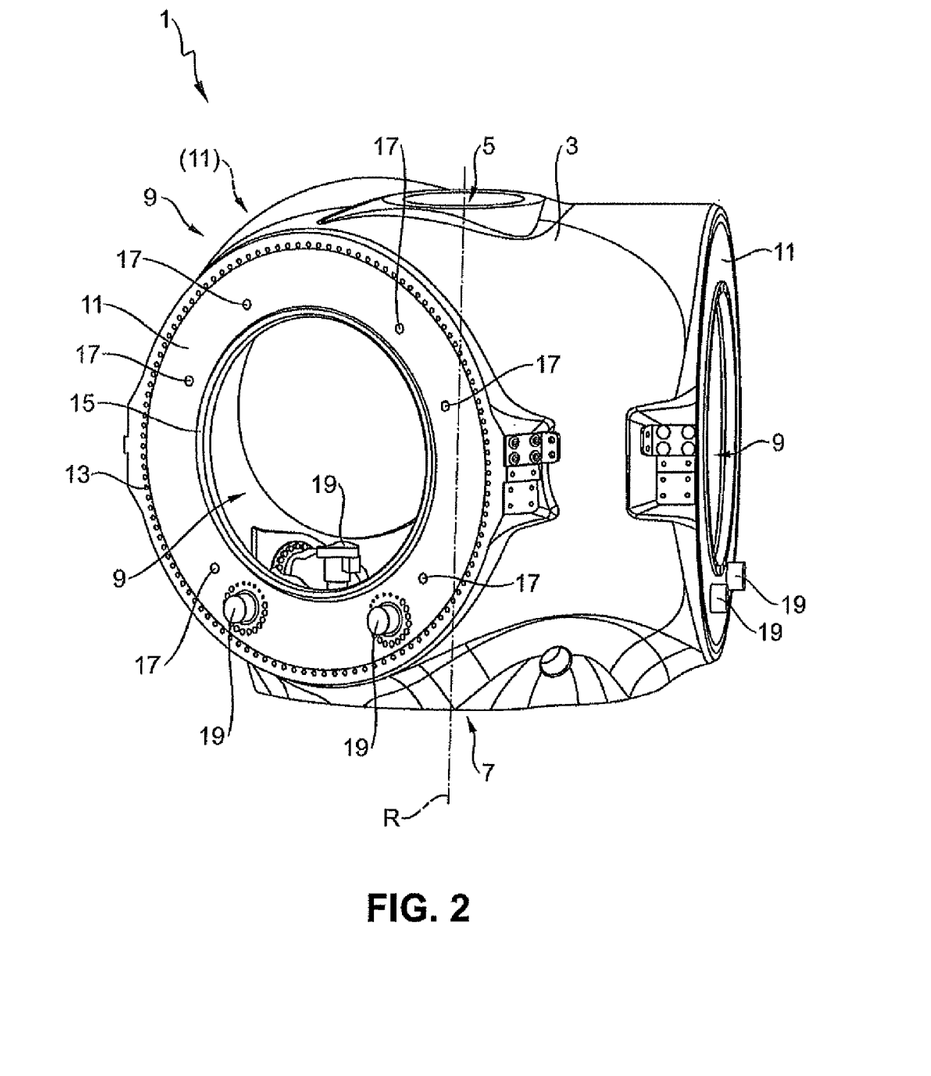
FIG. 2 shows a diagrammatic perspective view of a rotor hub according to a first preferred embodiment.

FIG. 2 shows the rotor hub 1. The rotor hub 1 has a hub housing 3. Provided in the hub housing 3 is a manhole 5 for passing therethrough towards the hub tip. The cap (not shown) of the rotor hub 1, also referred to as the spinner cap, is later accessible through the manhole 5.

Opposite the manhole 5, the rotor hub 1 has a connecting flange 7 for connecting the rotor hub 1 with a rotary connection. The rotor hub 1 can be connected in generally known manner to the rest of the nacelle 104 of the wind turbine 100.

A rotor axis R extends through the rotor hub 1 in the longitudinal direction.

The rotor hub 1 has a plurality of connecting portions for connection of the rotor hub 1 to a respective rotor blade 108, wherein a respective connecting flange 11 is provided in each of the connecting portions. The connecting flange 1 has a respective through opening 9, delimited by an inside edge 15, into the interior of the rotor hub 1. At the outer peripheral end the connecting flange 11 has a drilling pattern 13 for the connection of a blade flange mounting 35 or blade adaptor 37 (see FIG. 6). In addition as viewed radially between the inside edge 15 and the outer peripheral edge the connecting flange 11 has a second drilling pattern which is dimensioned to serve as an interface 17 for fixing a module according to the invention (see FIG. 2 through 5).

Arranged at the rotor hub 1 for each connecting flange 11 and thus for each rotor blade is a respective pitch drive in the form of two drive motors 19. The drive motors 19 are adapted to interact with a corresponding tooth arrangement and thus to set the rotor blade 108 to the desired pitch angle in the connected state.

Figure 3:
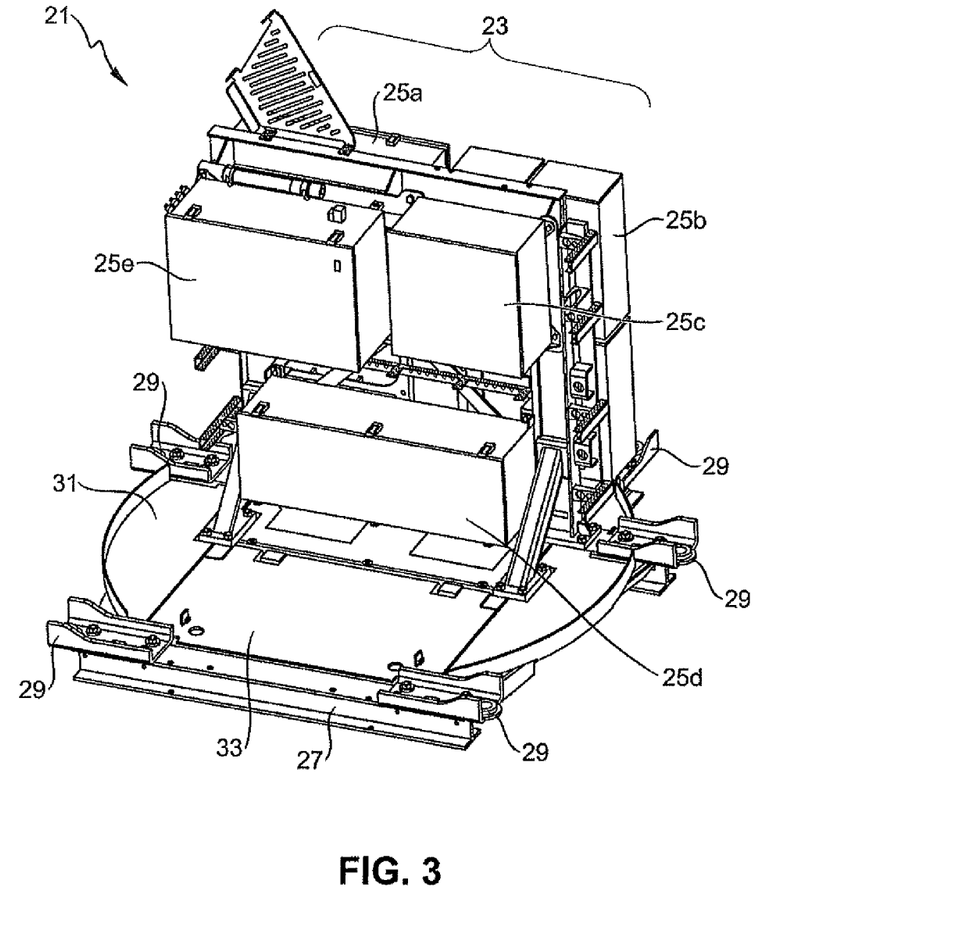
FIG. 3 shows a diagrammatic perspective view of a module for the rotor hub shown in FIG. 2.

The through openings 9 are adapted for example to receive the module 21 shown in FIG. 3. The module 21 has an arrangement 23 of electrical control devices 25a, 25b, 25c, 25d, 25e which are combined to form a structural unit on the module 21.

The module 21 has a supporting structure 27 to which the arrangement 23 of the electrical control devices 25a-25e is fixed. Provided on the supporting structure 27 are respective connecting points 29 which correspond to the interface 17 on the connecting flange 11 of the rotor hub 1 (FIG. 2).

The electrical control devices 25a-25e are for example selected from the list consisting of blade regulation control cabinet, transformer, blade relay, capacitor module, acoustic sensor, load regulation control cabinet, communication technology control cabinet, lightning current detector, ice accretion detection, blade heating control cabinet.

The control devices 25a-25e are so fixed to the supporting structure 27 and positioned that, projected on to the plane of the connecting surface 11, they are on a smaller area than is defined by the area of the through opening 9. The control devices 25a-25e are so positioned on the supporting structure 27 that, together with the supporting structure 27, they can be introduced as an entire module in one step into the interior of the rotor hub 1 through the through opening until the connecting points 29 bear against the connecting flange 11 and the corresponding interface 17. Preferably, the module 21 has a walkway surface 31 which can be walked upon in the manner of a working platform in operation of the wind turbine with the rotor blades and the rotor hub 1 being correspondingly stationary.

The module further has a hatch 33 which permits access from the interior of the rotor hub 1 outwardly into the rotor blades and which is preferably also walkable in the closed state (shown in FIG. 3).

Figure 4:
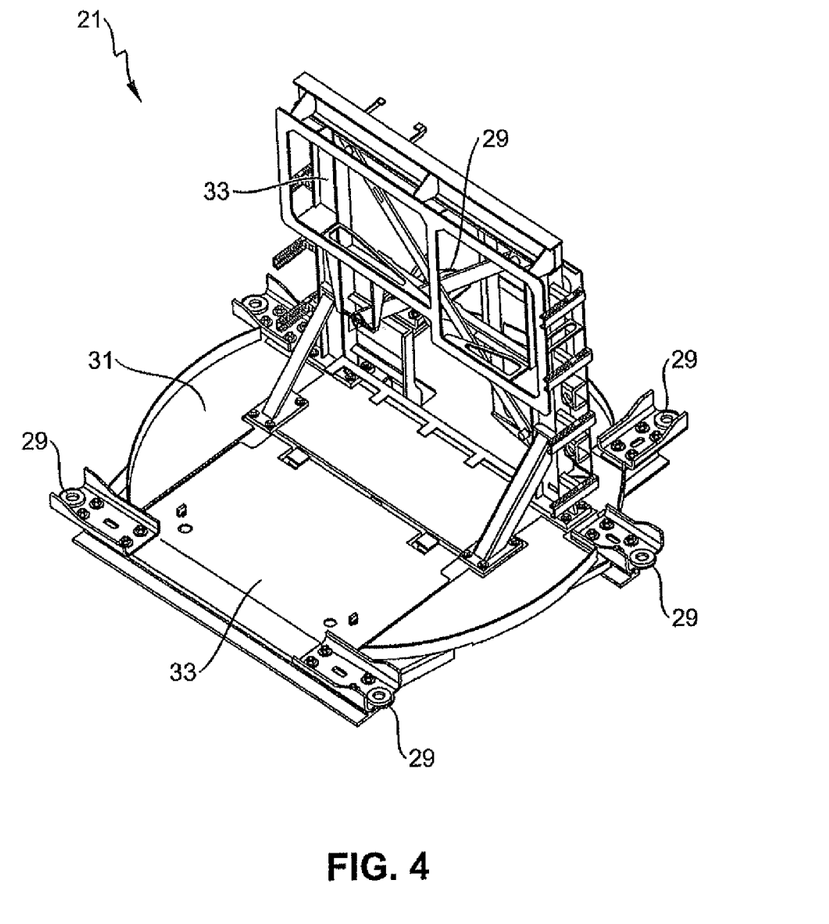
FIG. 4 shows a detail view of the module of FIG. 3.

FIG. 4 shows the supporting structure 27 of the module 21 with the electrical control devices removed. A second supporting structure portion 29 which serves for directly receiving the control devices 25a-25e is fixedly connected to the supporting structure 27 already shown in FIG. 2. The supporting structure 27, 29 is formed from a plurality of supporting struts which are arranged in angular relationship with each other and which are fixed to each other and which in particular in relation to the first portion 27 of the supporting structure exert a preferably bracing action on the connecting flange 11 when the module 21 is mounted to the connecting flange 11.

While the rotor hub 1 and the module 21 containing the control devices 25a-25e have each been shown separately in FIGS. 2 through 4 FIG. 5 shows the rotor hub 1 with assembled module 21. The connecting points 29 are respectively connected, in particular screwed, to the corresponding interface 17. The correspondingly oriented supporting struts of the supporting structure 27 optionally brace the connecting flange 11. Preferably provided between the connecting points 29 and the interface 17 are damping elements which at least attenuate the propagation of mechanical vibration between the housing of the rotor hub 1 and the electrical control devices 25a-25e (FIG. 3).

Figure 5:
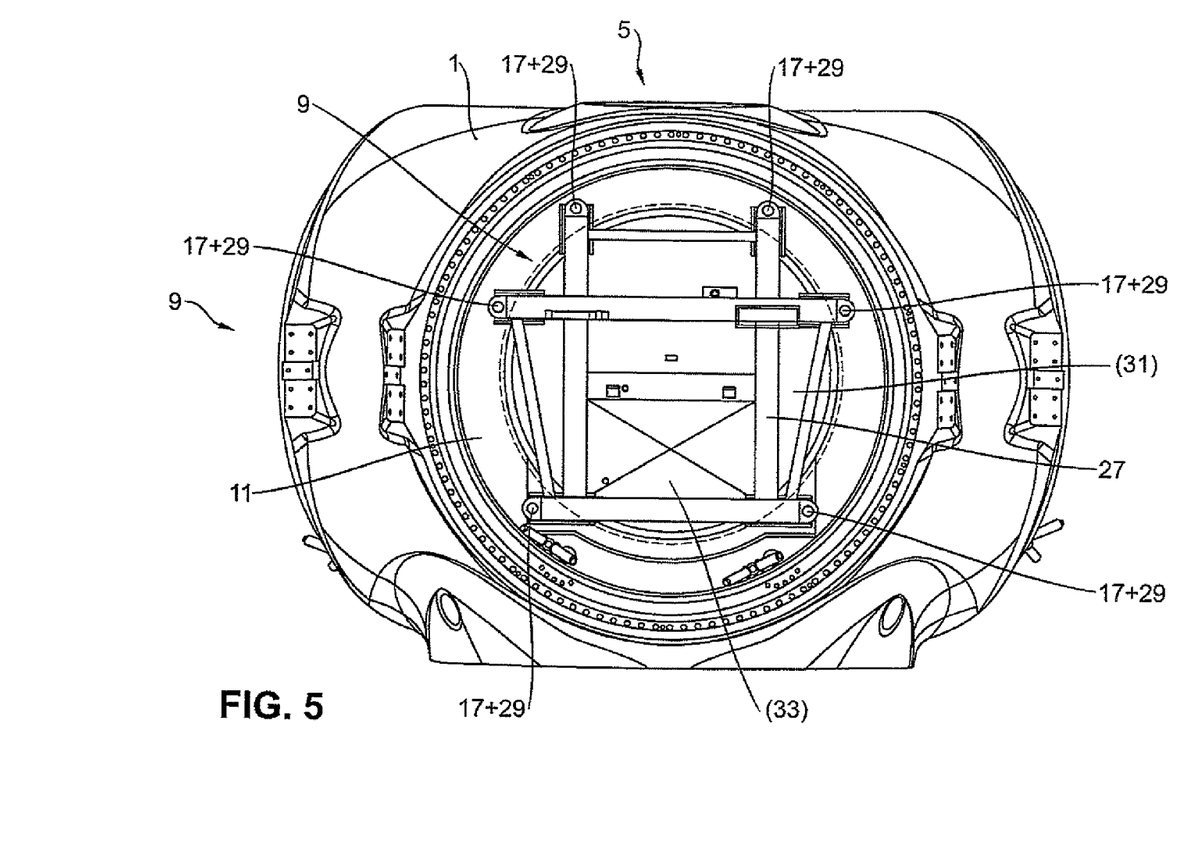
FIG. 5 shows a side view of the rotor hub of FIG. 2 with fitted module.
Figure 6:
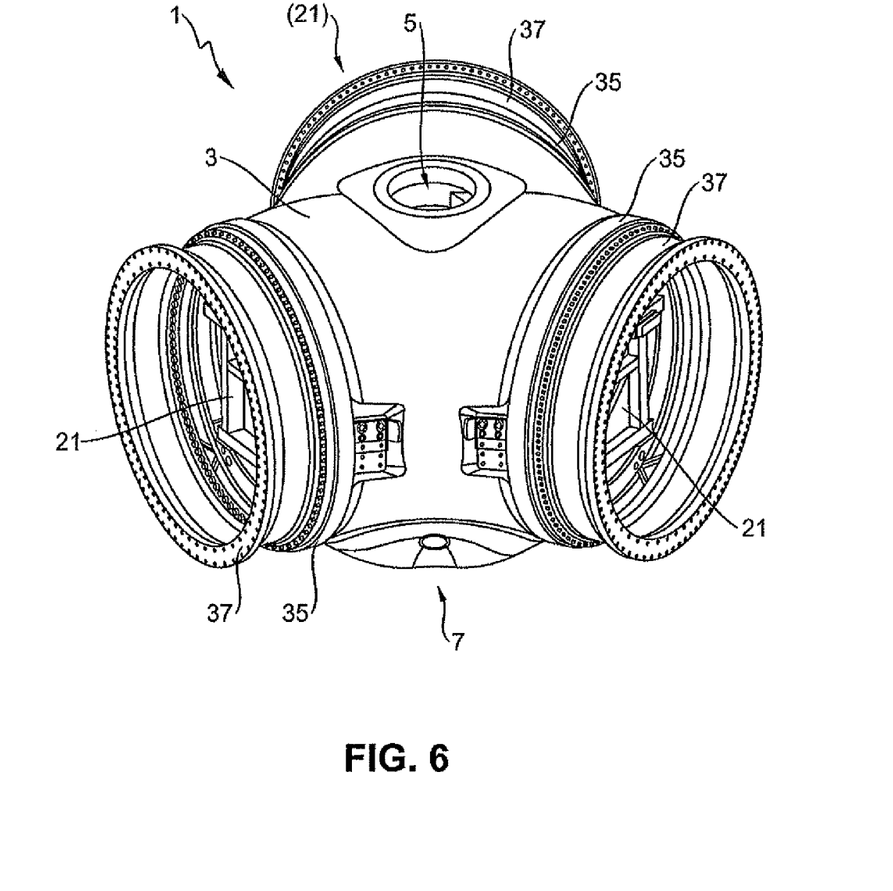
FIG. 6 shows a further diagrammatic perspective view of the rotor hub of FIG. 2 and FIG. 5 with further attachments.

FIG. 6 shows a further view of the assembled state which was also already to be seen in FIG. 5. In addition to the module 21 which has now been fitted in place a blade flange mounting 35, a blade adaptor 37, are further mounted at the rotor hub 1 at each connecting flange 11. The rotor hub 1 is now prepared to receive the rotor blades, purely from the mechanical point of view. It will generally be desirable for the rotor hub 1 also to be provided with a casing which however has not been shown in the present Figures for reasons of clarity.

Figure 7:
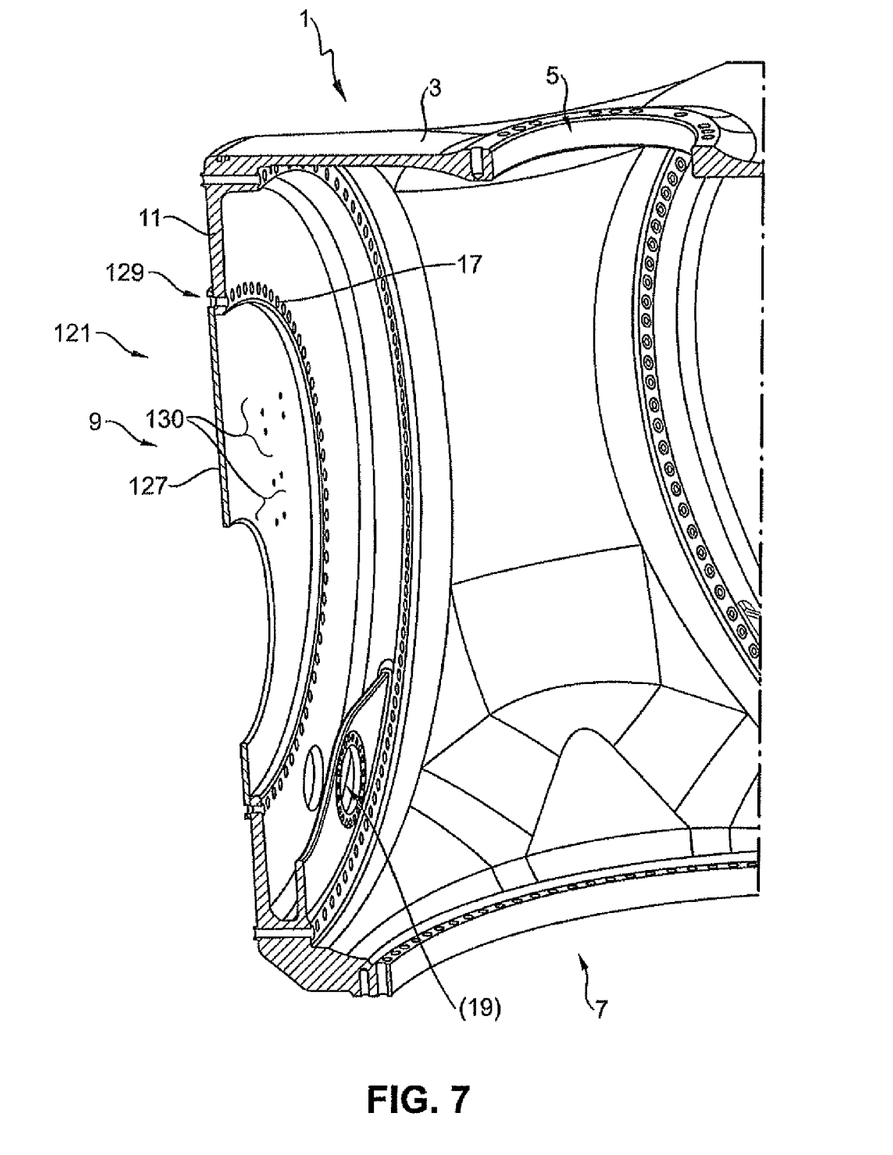
FIG. 7 shows a diagrammatic perspective view of part of a rotor hub according to a second embodiment.

FIG. 7 shows an alternative embodiment of a rotor hub 1 according to the invention. The rotor hub 1 and the hub housing 3 are of substantially the same structure as in FIG. 1 through 5, for which reason as far as possible the same references have been used. In regard to the identically used references attention is also directed to the foregoing description relating to FIGS. 1 through 5 for the avoidance of repetition.

The essential difference between the embodiment of FIG. 7 and FIGS. 1 through 6 lies only in the specifically employed supporting structure 127. Instead of a framework-like structure resting on supporting struts the module 21 provided in FIG. 7 has a supporting structure 127 in the form of a bracing disk. The bracing disk in turn has connecting points 129 which are matched with their drilling pattern to a corresponding interface 17 on the connecting flange 11.

In addition, the supporting structure 127 in FIG. 7 has mounting points 130 for fixing suitable fitments and control devices in a structural unit on the module 127. The structure in principle and the arrangement in principle of the electrical control devices on the module 121 can correspond in that respect to the structure of the module 21 shown in FIGS. 2 through 6. In that respect, attention is directed to the foregoing description.

For both embodiments, substantially the same procedure applies in terms of carrying out the assembly method according to the invention:

Firstly, the hub housing 3 which is part of the rotor hub 1 is provided for the rotor hub 1. There is then attributed to each of the connecting flanges 11 a module 21, 121 which is either prepared in prefabricated form or on which an arrangement of electrical control devices 25a-25e is mounted, by means of which the pitch drives 19 are to be controlled. The electrical control devices 25a-25e on the respective supporting structure 27, 127 are introduced as a module 21, 121 as a whole into the through opening 9 in the connecting flange 11 and the module 21, 121 is fixed to the corresponding interface 17 from the exterior with the connecting points 29, 129. As soon as the module 21, 121 is fixed then a blade flange mounting 35 and a blade adaptor 37 can additionally be fitted to the hub housing 3 of the rotor hub 1.

After assembly of the module 21 has been effected it is only necessary to lay the required cable harnesses in the interior of the hub housing 3 from the arrangement of electrical control devices 25a-25e to the corresponding drive motors 19. It will be noted however that an individually dedicated fitment of individual control devices is no longer required. In the fixed state both the supporting structure 27 and also the disk-shaped supporting structure 127 provide for stiffening bracing of the connecting flange 11, which overall contributes to enhancing the structural integrity of the rotor hub 1.

The invention claimed is:

1. A method of assembling a wind turbine, the method comprising:
   providing a hub housing having a plurality of connecting flanges, each of the plurality of flanges having a flange plane and a through opening and being configured for connection with a respective rotor blade, wherein each of the rotor blades is coupled to a respective pitch drive for rotating the rotor blade, and either:
   mounting an arrangement of electrical control devices on a module in such a way that the arrangement forms a structural unit, wherein the arrangement of electrical control devices is configured to control the pitch drives, or
   providing a module having an arrangement of electrical control devices for controlling the pitch drives in a form of a structural unit, and
   connecting the module to the hub housing using a supporting structure, wherein the arrangement of electrical control devices is fixed to the supporting structure, wherein the module is fixed via the supporting structure from outside the hub housing against a respective one of the plurality of connecting flanges, wherein the supporting structure includes a plurality of supporting struts connected to each other in angular relationship with a central opening, and wherein the plurality of supporting struts is fixed to the hub housing at the respective through opening such that the central opening of the plurality of supporting struts faces the through opening, and wherein the module is accessible from outside the hub housing through the central opening and the through opening; and
   connecting the arrangement of electrical control devices to the pitch drives.

2. The method as set forth in claim 1 wherein at each of the plurality of connecting flanges, the hub housing has a blade adaptor, wherein the modules having an arrangement of electrical control devices are mounted to the hub housing before the blade adaptor is mounted to the hub housing.

3. The method as set forth in claim 1 comprising bracing the hub housing by connecting the module.

4. A rotor hub of a wind turbine, comprising:
   a hub housing having a plurality of connecting flanges, wherein each of the plurality of connection flanges has a flange plane and a through opening and is configured to be coupled to a respective rotor blade;
   a plurality of pitch drives, wherein each of the plurality of pitch drives is configured to rotate a respective rotor blade; and
   an arrangement of electrical control devices,
   wherein the plurality of pitch drives is connected to the arrangement of electrical control devices, wherein the arrangement of the electrical control devices is configured to control one of the plurality of pitch drives, and
   wherein the arrangement of electrical control devices is provided in a module as a structural unit, wherein the module is connected to the hub housing,
   wherein the module has a supporting structure, wherein the arrangement of electrical control devices is fixed to the supporting structure, wherein the module is fixed via the supporting structure from outside the hub housing against one of the plurality of connecting flanges,
   wherein the supporting structure includes a plurality of supporting struts connected to each other in angular relationship with a central opening and a cross bar extending through the central opening, and wherein the plurality of supporting struts is coupled to an outer surface of a respective connecting flange at the respective through opening such that the central opening of the plurality of supporting struts faces the through opening, and the module is accessible to maintenance personnel from outside the hub housing through the central opening and the through opening.

5. The rotor hub as set forth in claim 4, wherein the supporting structure is configured to brace the rotor hub in a region of the plurality of connecting flanges.

6. The rotor hub as set forth in claim 4, wherein the central opening of each of the plurality of supporting struts includes a hatch coupled to the cross bar.

* * * * *